United States Patent
Schubert et al.

(10) Patent No.: US 9,454,965 B2
(45) Date of Patent: *Sep. 27, 2016

(54) CONTENT-BASED AUDIO PLAYBACK EMPHASIS

(71) Applicant: MModal IP LLC, Franklin, TN (US)

(72) Inventors: Kjell Schubert, Pittsburgh, PA (US);
Juergen Fritsch, Pittsburgh, PA (US);
Michael Finke, Pittsburgh, PA (US);
Detlef Koll, Pittsburgh, PA (US)

(73) Assignee: MModal IP LLC, Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/852,021

(22) Filed: Sep. 11, 2015

(65) Prior Publication Data

US 2016/0005402 A1    Jan. 7, 2016

Related U.S. Application Data

(63) Continuation of application No. 14/317,873, filed on Jun. 27, 2014, now Pat. No. 9,135,917, which is a continuation of application No. 12/859,883, filed on Aug. 20, 2010, now Pat. No. 8,768,706, which is a continuation of application No. 11/187,119, filed on Jul. 22, 2005, now Pat. No. 7,844,464.

(51) Int. Cl.
*G10L 15/00* (2013.01)
*G10L 15/26* (2006.01)
(Continued)

(52) U.S. Cl.
CPC .............. *G10L 15/26* (2013.01); *G06F 17/273* (2013.01); *G06F 17/2785* (2013.01); *G10L 15/1807* (2013.01); *G10L 15/22* (2013.01); *G10L 15/265* (2013.01); *G10L 21/04* (2013.01)

(58) Field of Classification Search
CPC ..... G10L 15/08; G10L 13/043; G10L 15/07; G10L 15/10; G10L 15/142; G10L 15/144; G10L 15/1815; G10L 15/22; G10L 15/20; G10L 15/26; G10L 15/183; G10L 15/63; G06F 17/2785
USPC ........ 704/270.1, 270, 275, 236, 235, 9, 249, 704/251, 256, 254
See application file for complete search history.

(56) References Cited

U.S. PATENT DOCUMENTS 5,418,717 A * 5/1995 Su ..................... G06F 17/2715
704/9
5,832,430 A * 11/1998 Lleida ................... G10L 15/142
704/231

(Continued)

FOREIGN PATENT DOCUMENTS

| JP | 2003131694 | 5/2003 |
| JP | 2005115391 | 4/2005 |
| WO | 2004066271 A1 | 5/2004 |

*Primary Examiner* — Michael Colucci
(74) *Attorney, Agent, or Firm* — Robert Plotkin, P.C.; Robert Plotkin (57) ABSTRACT

Techniques are disclosed for facilitating the process of proofreading draft transcripts of spoken audio streams. In general, proofreading of a draft transcript is facilitated by playing back the corresponding spoken audio stream with an emphasis on those regions in the audio stream that are highly relevant or likely to have been transcribed incorrectly. Regions may be emphasized by, for example, playing them back more slowly than regions that are of low relevance and likely to have been transcribed correctly. Emphasizing those regions of the audio stream that are most important to transcribe correctly and those regions that are most likely to have been transcribed incorrectly increases the likelihood that the proofreader will accurately correct any errors in those regions, thereby improving the overall accuracy of the transcript.

10 Claims, 7 Drawing Sheets

(51) Int. Cl.
*G10L 15/22* (2006.01)
*G10L 21/04* (2013.01)
*G06F 17/27* (2006.01)
*G10L 15/18* (2013.01)

(56) References Cited

U.S. PATENT DOCUMENTS

| | | | | |
|---|---|---|---|---|
| 6,006,183 A * | 12/1999 | Lai | ............ | G10L 15/22 704/235 |
| 6,122,613 A * | 9/2000 | Baker | ............ | G10L 15/22 704/235 |
| 6,571,210 B2 * | 5/2003 | Hon | ............ | G10L 15/08 704/243 |
| 7,117,437 B2 * | 10/2006 | Chen | ............ | G10L 15/00 704/257 |
| 7,249,012 B2 * | 7/2007 | Moore | ............ | G06F 17/2827 704/2 |
| 7,274,775 B1 * | 9/2007 | Zavaliagkos | ............ | H04M 3/533 369/25.01 |
| 7,383,172 B1 * | 6/2008 | Jamieson | ............ | G06F 17/2785 704/9 |
| 7,529,665 B2 * | 5/2009 | Kim et al. | ............ | 704/236 |
| 7,912,713 B2 * | 3/2011 | Vair | ............ | G10L 15/08 704/236 |
| 8,175,877 B2 * | 5/2012 | Gilbert | ............ | G10L 15/20 704/226 |
| 2002/0133341 A1 * | 9/2002 | Gillick | ............ | G10L 15/32 704/235 |
| 2003/0028375 A1 * | 2/2003 | Kellner | ............ | G10L 15/22 704/235 |
| 2004/0049385 A1 * | 3/2004 | Lovance | ............ | G10L 15/063 704/235 |
| 2004/0225667 A1 * | 11/2004 | Hu | ............ | G06F 17/30719 |
| 2006/0136207 A1 * | 6/2006 | Kim | ............ | G10L 15/08 704/249 |
| 2008/0140401 A1 * | 6/2008 | Abrash | ............ | G09B 19/06 704/251 |

* cited by examiner

CONTENT-BASED AUDIO PLAYBACK EMPHASIS

CROSS REFERENCE TO RELATED APPLICATIONS

This application is related to the following commonly-owned U.S. patent applications, hereby incorporated by reference:

U.S. patent application Ser. No. 10/923,517, filed on Aug. 20, 2004, entitled, "Automated Extraction of Semantic Content and Generation of a Structured Document from Speech"; and U.S. patent application Ser. No. 10/922,513, filed on Aug. 20, 2004, entitled, "Document Transcription System Training."

BACKGROUND

1. Field of the Invention

The present invention relates to audio playback and, more particularly, to audio playback for use in proofreading draft transcripts of speech.

2. Related Art

It is desirable in many contexts to transcribe human speech. In the legal profession, for example, transcriptionists transcribe testimony given in court proceedings and in depositions to produce a written transcript of the testimony. Similarly, in the medical profession, transcripts are produced of diagnoses, prognoses, prescriptions, and other information dictated by doctors and other medical professionals. Transcripts in these and other fields typically need to be highly accurate (as measured in terms of the degree of correspondence between the semantic content (meaning) of the original speech and the semantic content of the resulting transcript) because of the reliance placed on the resulting transcripts and the harm that could result from an inaccuracy (such as providing an incorrect prescription drug to a patient). It may be difficult to produce an initial transcript that is highly accurate for a variety of reasons, such as variations in: (1) features of the speakers whose speech is transcribed (e.g., accent, volume, dialect, speed); (2) external conditions (e.g., background noise); (3) the transcriptionist or transcription system (e.g., imperfect hearing or audio capture capabilities, imperfect understanding of language); or (4) the recording/transmission medium (e.g., paper, analog audio tape, analog telephone network, compression algorithms applied in digital telephone networks, and noises/artifacts due to cell phone channels).

The first draft of a transcript, whether produced by a human transcriptionist or an automated speech recognition system, may therefore include a variety of errors. Typically it is necessary to proofread and edit such draft documents to correct the errors contained therein. Transcription errors that need correction may include, for example, any of the following: missing words or word sequences; excessive wording; mis-spelled, -typed, or -recognized words; missing or excessive punctuation; misinterpretation of semantic concepts (e.g., mistakenly interpreting an allergy to a particular medication as the medication itself); and incorrect document structure (such as incorrect, missing, or redundant sections, enumerations, paragraphs, or lists).

Although it might be possible for the speaker whose speech is transcribed to proofread the draft transcript merely by reading the transcript (because the content of the speech may be fresh in the speaker's mind), any other proofreader must typically listen to a recording of the speech while reading the draft transcript in order to proofread it. Proofreading performed in this way can be tedious, time-consuming, costly, and itself error-prone. What is needed, therefore, are improved techniques for correcting errors in draft transcripts.

SUMMARY

Techniques are disclosed for facilitating the process of proofreading draft transcripts of spoken audio streams. In general, proofreading of a draft transcript is facilitated by playing back the corresponding spoken audio stream with an emphasis on those regions in the audio stream that are highly relevant or likely to have been transcribed incorrectly. Regions may be emphasized by, for example, playing them back more slowly than regions that are of low relevance and likely to have been transcribed correctly. Emphasizing those regions of the audio stream that are most important to transcribe correctly and those regions that are most likely to have been transcribed incorrectly increases the likelihood that the proofreader will accurately correct any errors in those regions, thereby improving the overall accuracy of the transcript.

Other features and advantages of various aspects and embodiments of the present invention will become apparent from the following description and from the claims.

DETAILED DESCRIPTION

Figure 1A:
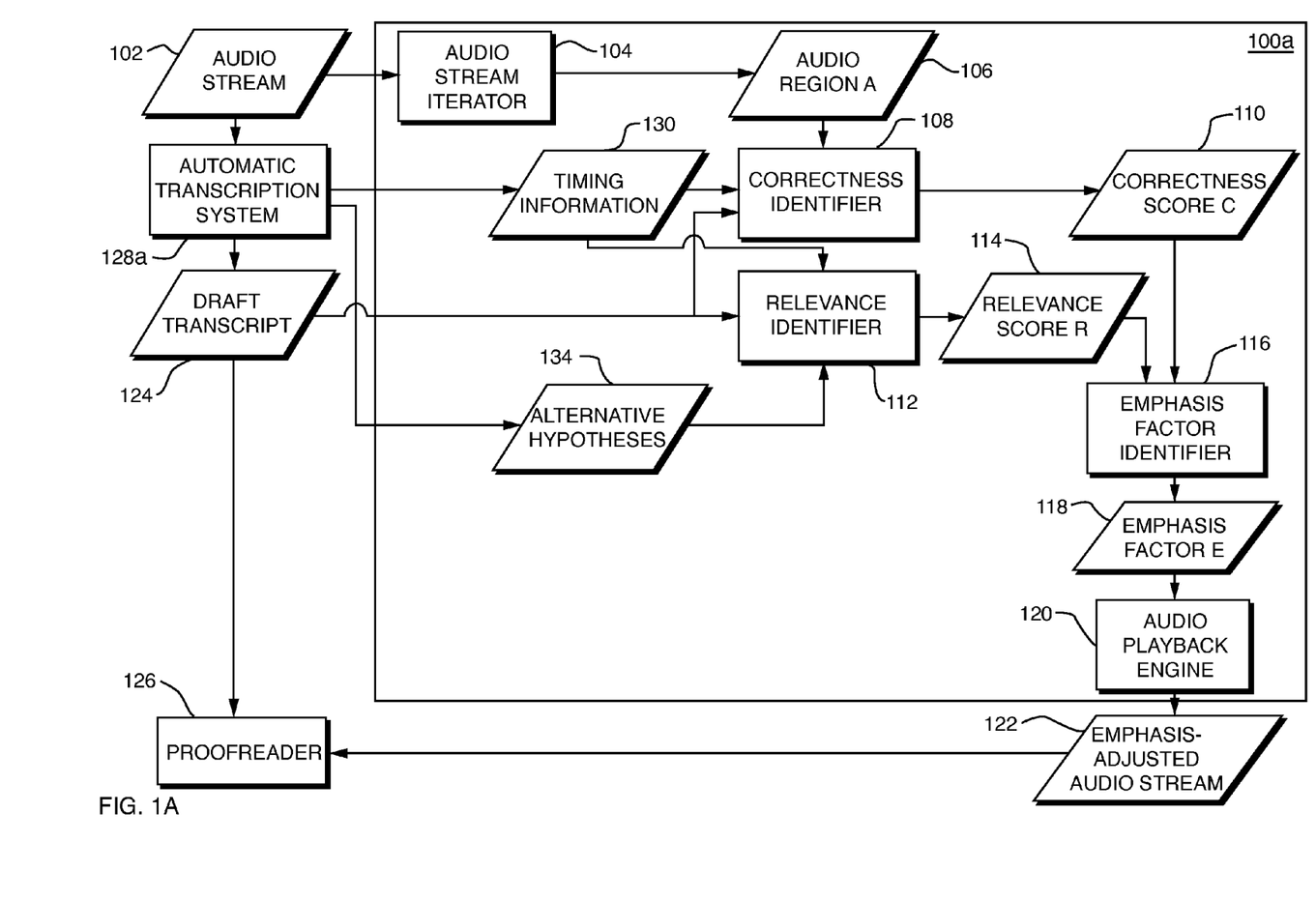
FIGS. 1A-1B are dataflow diagrams of systems for facilitating the correction of errors in a draft transcript of a spoken audio stream according to embodiments of the present invention.
Figure 1B:
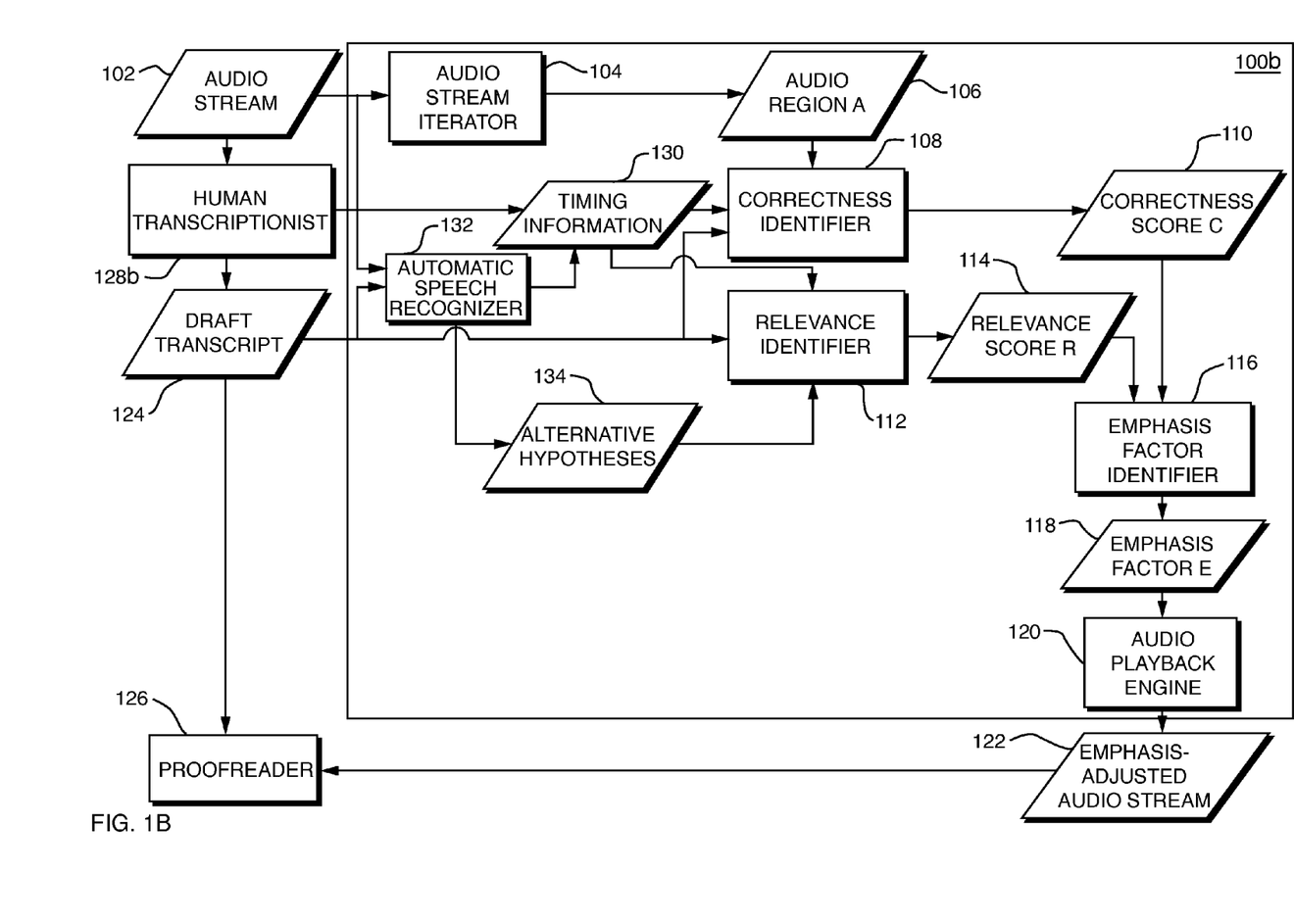

Referring to FIGS. 1A-1B, dataflow diagrams are shown of systems 100a-b for facilitating the correction of errors in a draft transcript 124 of a spoken audio stream 102. In general, each of the systems 100a-b plays back a modified version 122 of the audio stream 102 to a human proofreader 126 who also has access to the draft transcript 124. Regions in the audio stream 102 that are highly relevant (important) or that are likely to have been transcribed incorrectly in the draft transcript 124 are emphasized in the modified version 122 of the audio stream 102 that is played back to the human proofreader 126. Regions may be emphasized, for example, by playing them back more slowly than regions that are of low relevance and likely to have been transcribed correctly. Such emphasis may be achieved, for example, by speeding up the playback of the remaining regions (having low relevance and high likelihood of correctness) in the audio stream 102 in comparison to a default playback rate. As a result, the proofreader's 126 attention is focused on those regions of the audio stream 102 that are most important to be transcribed correctly and those regions that are most likely to have been transcribed incorrectly, thereby increasing the likelihood that the proofreader 126 will correct any errors in those regions. Furthermore, if emphasis is achieved by speeding up the playback of regions that are irrelevant and likely to have been transcribed correctly, proofreading may be performed more quickly than with conventional playback methods, but without sacrificing accuracy.

The two systems 100*a-b* differ in that the system 100*a* shown in FIG. 1A uses an automatic transcription system 128*a* to produce the draft transcript 124, timing information 130, and alternative hypotheses 134, while the system 100*b* shown in FIG. 1B uses a human transcriptionist 128*b* to produce the draft transcript 124 and an automatic speech recognizer 132 to produce the timing information 130 and alternative hypotheses 134. Because the operation of the two systems 100*a* and 100*b* is otherwise similar, the two systems may be referred to herein collectively as system 100. Similarly, the automatic transcription system 128*a* and human transcriptionist 128*b* may be referred to herein collectively as transcription system 128. Differences between the two systems will be described when they are relevant.

The audio stream 102 may be any kind of spoken audio stream. The spoken audio stream 102 may, for example, be dictation by a doctor describing a patient visit. The spoken audio stream 102 may take any form. For example, it may be a live audio stream received directly or indirectly (such as over a telephone or IP connection), or an audio stream recorded on any medium and in any format.

The draft transcript 124 may be any document that represents some or all of the content in the spoken audio stream 102. The draft transcript 124 may, for example, have been generated by transcription system 128 including a human transcriptionist, an automated speech recognizer, or any combination thereof. The draft transcript 124 may have been generated using any of the techniques disclosed in the above-referenced patent application entitled "Automated Extraction of Semantic Content and Generation of a Structured Document from Speech." As described therein, the draft transcript 124 may be either a literal (verbatim) transcript or a non-literal transcript of the spoken audio stream 102. As further described therein, although the draft transcript 124 may be a plain text document, the draft transcript 124 may also, for example, be a structured document, such as an XML document which delineates document sections and other kinds of document structure.

The draft transcript 124 may be a structured document containing not only plain text but also document structures representing semantic and syntactic concepts, as those terms are defined in the above-referenced patent application entitled "Automated Extraction of Semantic Content and Generation of a Structured Document from Speech." As described in more detail therein, the term "concept" includes, for example, dates, times, numbers, codes, medications, medical history, diagnoses, prescriptions, phrases, enumerations and section cues. The term "content" is used herein to refer generally to any subset of a document, which may therefore include not only plain text but also representations of one or more concepts.

The techniques disclosed in the above-referenced patent application entitled "Automated Extraction of Semantic Content and Generation of a Structured Document from Speech," and automatic transcription systems more generally, produce timing information 130 that correlates content with corresponding regions of the audio stream 102. Such timing information 130 may, for example, map each word in the draft transcript 124 to a corresponding region in the audio stream 102 representing that word. The following discussion assumes that such timing information 130 is available to the playback emphasis system 100. In the system 100*a* of FIG. 1A, the timing information 130 is produced by the automatic transcription system 128*a* during production of the draft transcript 124. In the system 100*b* of FIG. 1B, the timing information 130 is produced by the automatic speech recognizer 132 based on the audio stream 102 and the draft transcript 124 produced by the human transcriptionist 128*b*.

Figure 2:
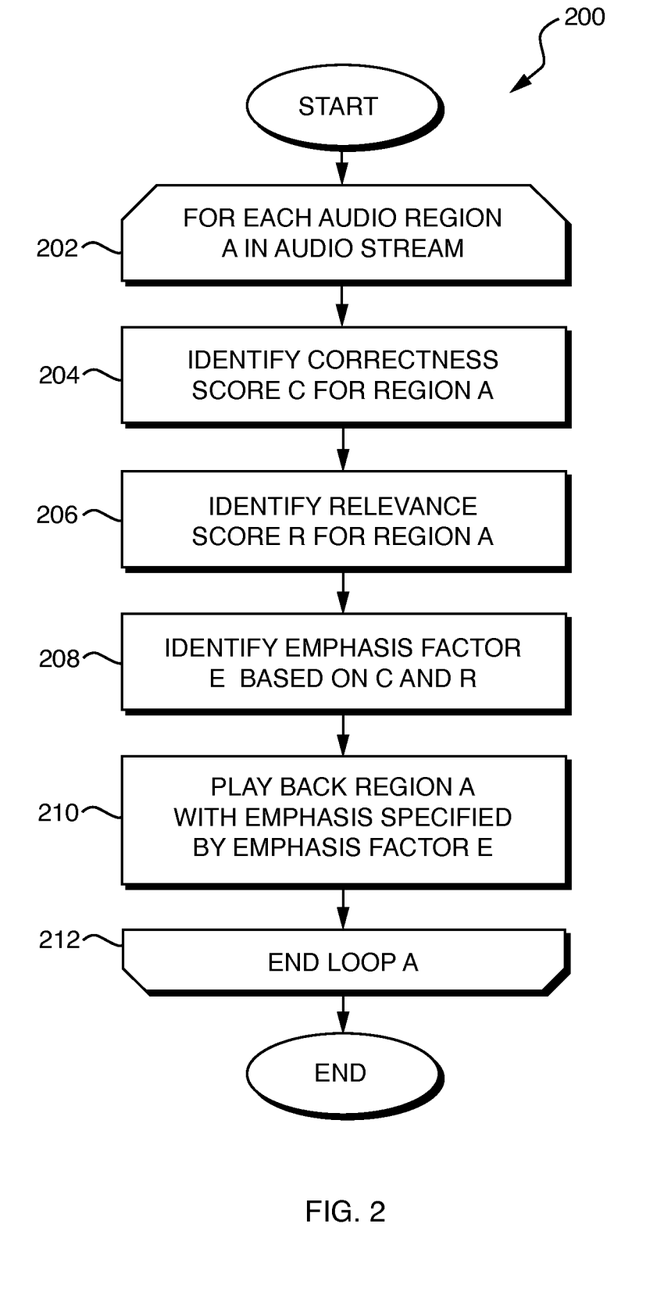
FIG. 2 is a flowchart of a method that is performed by the playback emphasis system of FIG. 1 in one embodiment of the present invention to emphasize regions of the audio stream during playback.

Referring to FIG. 2, a flowchart is shown of a method 200 that is performed by the playback emphasis system 100 in one embodiment of the present invention to emphasize regions of the audio stream 102 during playback. An audio stream iterator 104 enters a loop over each audio region A 106 in the audio stream (step 202).

A correctness identifier 108 identifies an estimate C 110 of a likelihood that the audio region A was recognized (transcribed) correctly in the draft transcript 124 (step 204). This estimate is referred to herein as a "correctness score." Examples of techniques that may be used to generate the correctness score C 110 will be described below with respect to FIG. 4.

A relevance identifier 112 identifies a measure R 114 of potential relevance (i.e., importance) of the region A (step 206). This measure is referred to herein as a "relevance score." Examples of techniques that may be used to generate the relevance score R 114 will be described below with respect to FIG. 5.

An emphasis factor identifier 116 identifies an emphasis factor E 118 based on the correctness score C 110 and the relevance score R 114 (step 208). Examples of techniques that may be used to generate the emphasis factor E 118 will be described in more detail below with respect to FIG. 6.

An audio playback engine 120 plays back the audio region A 106 in accordance with the emphasis factor E 118 to produce a region of an emphasis-adjusted audio signal 122 that is played to the human proofreader 126 (step 210). Note that if the emphasis factor E 118 indicates a neutral emphasis, the resulting region of the emphasis-adjusted audio stream 122 may be the same as the region A 106 of the original audio stream 102. If the audio playback engine 120 is a conventional audio playback engine, a preprocessor (not shown) may apply the emphasis factor E 118 to the audio region A 106 to produce an audio signal that is suitable for playback by the audio playback engine 120. Furthermore, the emphasis-adjusted audio stream 122 may be further processed (such as by further speeding it up or slowing it down) in accordance with user preferences or other requirements. The method 200 repeats steps 204-210 for the remaining regions in the audio stream 102 (step 212), thereby applying any appropriate emphasis to the regions when playing them back to the proofreader 126.

Having described one embodiment of the present invention in general, particular embodiments of the present invention will now be described in more detail. One way in which regions of the audio stream 102 may be emphasized is by playing them back more slowly than other regions in the audio stream. The emphasis factor 118 may, therefore, be a timescale adjustment factor which may be multiplied by a default playback rate to achieve the rate at which to play back the corresponding audio region A 106. The audio playback engine 120 may perform this timescale adjustment in accordance with the emphasis factor 118 when generating the emphasis-adjusted audio signal 122, which is, in this case, a timescale-adjusted version of the audio region A 106.

Figure 3:
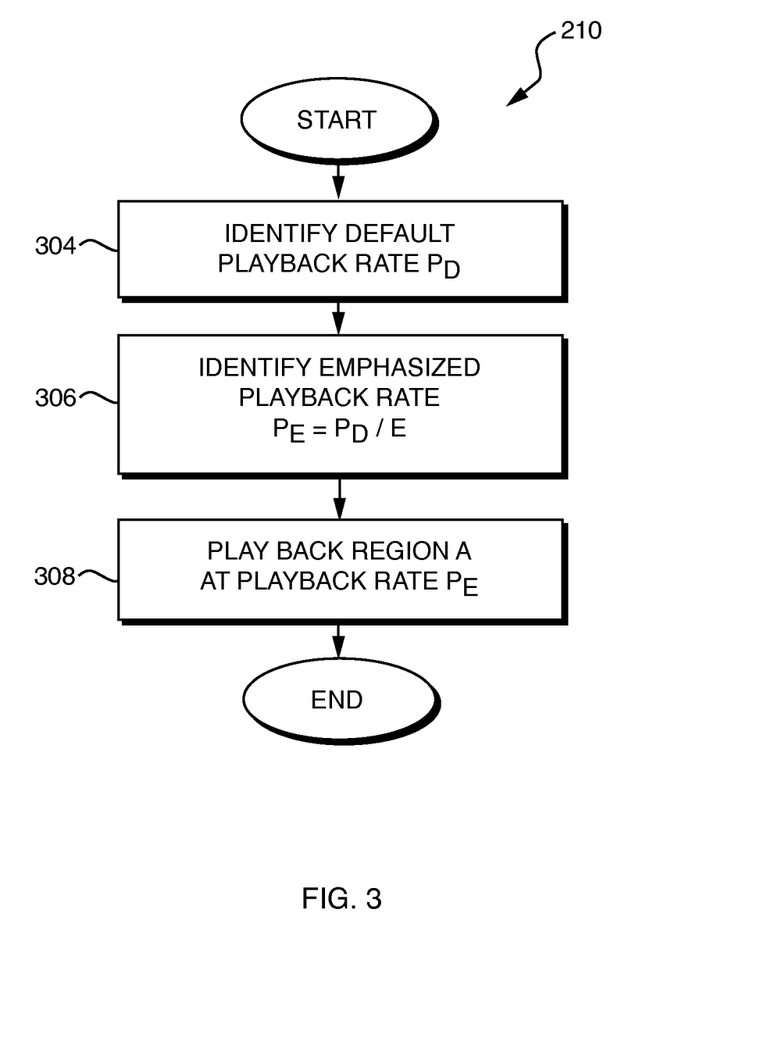
FIG. 3 is a flowchart of a method for playing back an audio region in accordance with a specified emphasis factor according to one embodiment of the present invention.

For example, referring to FIG. 3, a flowchart is shown of a method that may be used to implement step 210 of the method 200 shown in FIG. 2 for playing back the audio region A 106 with any emphasis specified by the emphasis factor E 118. The method identifies a default playback rate $P_D$ (step 304). The default playback rate $P_D$ may be any playback rate, such as a real-time playback rate, at which the audio stream 102 is to be played back without emphasis. The method identifies an emphasized playback rate $P_E$ by dividing the default playback rate $P_D$ by the emphasis factor E 118 (step 306). The method plays back the audio region A at the emphasized playback rate $P_E$ (step 308).

Note that since the emphasis factor E may be less than one, equal to one, or greater than one, the "emphasized" playback rate $P_E$ may be slower than, faster than, or equal to the default playback rate $P_D$. Therefore, although $P_E$ is referred to herein as an "emphasized" playback rate, playing back the audio region A 106 at rate $P_E$ may either emphasize, de-emphasize, or place no emphasis on audio region A 106 depending on the value of E (and hence the value of $P_E$). The same is true generally of techniques other than timescale adjustment that may be used to modify the audio region A 106 during playback based on the emphasis factor E 118.

Furthermore, an emphasized audio region may be played back at slower speeds than other regions in essentially two ways: (1) by decreasing the playback rate of the emphasized audio region relative to the default playback rate $P_D$; and (2) by increasing the playback rate of the region(s) surrounding the emphasized audio region relative to the default playback rate $P_D$. Both such techniques are within the scope of the present invention, and the two may be combined with each other in various ways. The same is true generally of techniques other than timescale adjustment that may be used to modify the audio region A 106 during playback based on the emphasis factor E 118. One advantage, however, of emphasizing a particular audio region by speeding up the playback of surrounding audio regions is that doing so decreases the total time required to play back the audio stream 102 to the proofreader 126, thereby increasing the rate at which proofreading may be performed.

It was stated above that the correctness identifier 108 identifies the correctness score 110 for audio region A 106. The correctness identifier 108 may identify the correctness score 110 in any of a variety of ways. For example, referring to FIG. 4, a flowchart is shown of a method that may be used to implement step 204 of the method 200 shown in FIG. 2 for identifying the correctness score C 110.

Figure 4:
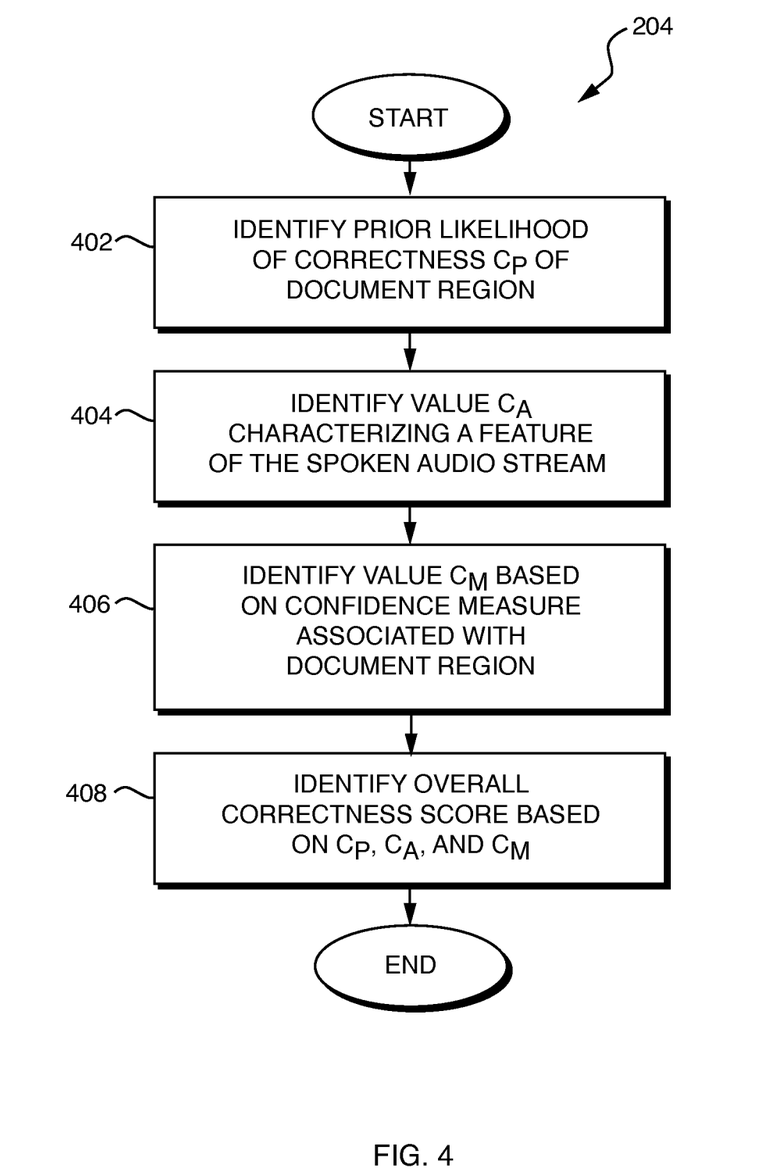
FIG. 4 is a flowchart of a method for identifying a correctness score for a region of an audio stream according to one embodiment of the present invention.

The correctness identifier 108 identifies a prior likelihood of correctness $C_P$ of the region of the draft transcript 124 that corresponds to the audio region A 106 (step 402). This region of the draft transcript 124 may include any kind of "content" as that term is defined herein. A "prior likelihood of correctness" is any estimate of a likelihood of correctness that is pre-assigned to particular content. For example, human transcriptionists often mistake the words "ascending" and "descending" for each other. Therefore, the words "ascending" and "descending" in the draft transcript 124 are likely to have been incorrectly transcribed. Such words may be assigned a relatively low prior likelihood of correctness. Similarly, automatic transcription systems may systematically misrecognize certain words, which may be assigned a relatively low prior likelihood of correctness. Automatic transcription systems often misrecognize different words than human transcriptionists, and as a result the same word may have a different prior likelihood of correctness depending on the transcription method in use.

The correctness identifier 108 identifies a value $C_A$ characterizing a feature of the spoken audio stream 102, such as an identity of a speaker of the spoken audio stream 102 or a signal-to-noise ratio of the spoken audio stream 102 (step 404). If, for example, a particular speaker is known to be difficult to understand and therefore likely to be transcribed incorrectly, the correctness identifier 108 may assign a relatively low value to $C_A$. If, for example, the audio stream 102 has a relatively high signal-to-noise ratio, then the draft transcript 124 was relatively likely to have been transcribed correctly, and the correctness identifier 108 may assign a relatively high value to $C_A$.

Automatic speech recognizers typically generate a confidence measure for each word in a document representing a degree of confidence that the word was recognized correctly, i.e., that the word correctly represents the corresponding speech in the audio stream from which it was recognized. If the correctness identifier 108 has access to such confidence measures, the correctness identifier 108 may identify a value $C_M$ based on the confidence measure associated with the region of the draft transcript 124 that corresponds to region A 106 of the audio stream 102 (step 406).

The correctness identifier 108 identifies the overall correctness score C 110 based on the individual scores $C_P$, $C_A$, and $C_M$ (step 408). The correctness identifier 108 may, for example, identify the overall correctness score C 110 as a weighted sum of $C_P$, $C_A$, and $C_M$. Such a weighting may, for example, favor the emphasis of audio regions having a low prior likelihood of correctness, audio streams having characteristics (such as low signal-to-noise ratios) indicating a high likelihood of error, and regions having low confidence measures. Alternatively, the correctness identifier 108 may identify the overall correctness score C 110 as the minimum of $C_P$, $C_A$, and $C_M$. These are merely examples; the correctness identifier 108 may identify the overall correctness score C 110 in any way, such as by using any rule or algorithm.

Furthermore, the individual scores $C_P$, $C_A$, and $C_M$ are merely examples of the factors that the correctness identifier 108 may take into account when generating the correctness score 110. The correctness identifier 108 may take into account any combination of these or other factors, using any weighting or other combination function, when generating the correctness score.

It was stated above that the relevance identifier 112 generates the relevance score 114 for audio region A 106. The relevance identifier 112 may generate the relevance score 114 in any of a variety of ways. For example, referring to FIG. 5, a flowchart is shown of a method that may be used to implement step 206 of the method 200 shown in FIG. 2 for generating the relevance score R 114.

Figure 5:
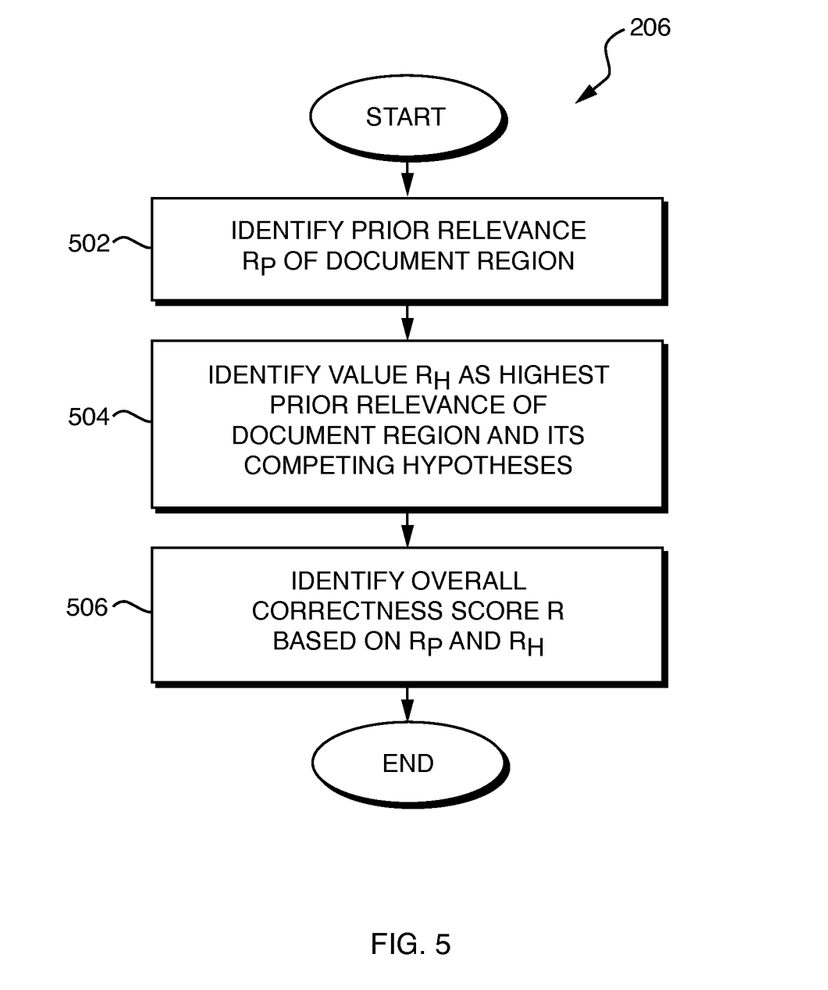
FIG. 5 is a flowchart of a method for identifying a relevance score for a region of an audio stream according to one embodiment of the present invention.

The relevance identifier 112 identifies a prior relevance $R_P$ of the region of the draft transcript 124 corresponding to region A 106 of the audio stream 102 (step 502). For example, in a medical report, the section describing allergies of the patient is always highly important (relevant). Therefore, the allergies section may be assigned a high prior relevance. Similarly, certain content, such as the words "no" and "not," may be assigned a high prior relevance. Furthermore, empty text (which likely represents periods of silence or non-speech events such as coughs) may be assigned a low prior relevance.

Automatic speech recognizers typically generate a set of alternative hypotheses 134 (i.e., candidate words) for each recognized region in an audio stream. For example, when the automatic transcription system 128a attempts to recognize the spoken word "knot," the system 128a may generate a list of alternative hypotheses 134 consisting of the words "knot," "not," "naught," and "nit," in that order. The system 128a typically associates a confidence measure with each hypothesis representing a degree of confidence that the hypothesis accurately represents the corresponding audio region. The final output of an automatic speech recognizer, such as the draft transcript 124, typically only includes the best hypothesis (i.e., the hypothesis having the highest confidence measure) for each corresponding region in the audio stream 102. If, however, the draft transcript 124 includes information about competing hypotheses, or if the relevance identifier 112 otherwise has access to the competing hypotheses 134, the relevance identifier 112 may use such competing hypothesis information 134 to generate the relevance score R 114.

For example, the relevance identifier 112 may identify the prior relevance $R_H$ of the competing hypothesis having the highest prior relevance of all competing hypotheses for the current document region (step 504). In the example above, in which the competing hypotheses are "knot," "not," "naught," and "nit," the word "not" most likely has the highest prior relevance. In such a case, the relevance identifier 112 may use the prior relevance of the word "not" as the value of $R_H$ even though the word "not" does not appear in the draft transcript 124. Elevating the relevance of the word "knot" in this way may be useful because it is important to bring the word to the attention of the proofreader 126 in the event that the highly-relevant word "not" was misrecognized as "knot."

The relevance identifier 112 identifies the overall relevance score R 114 based on the individual scores $R_P$ and $R_H$ (step 506). The relevance identifier 112 may, for example, identify the overall relevance score R 114 as a weighted sum of $R_P$ and $R_H$. Such a weighting may, for example, favor the emphasis of audio regions having a high prior relevance and having competing hypotheses with a high prior relevance. This is merely an example; the relevance identifier 112 may identify the overall relevance score R 114 in any way. Furthermore, the individual scores $R_P$ and $R_H$ are merely examples of the factors that the relevance identifier 112 may take into account when generating the relevance score 114. Furthermore, the relevance identifier 112 may take into account any combination of these or other factors, using any weighting or other combination function, when generating the relevance score 114. For example, the relevance identifier 112 may identify the overall relevance score R 114 as the maximum of $R_P$ and $R_H$.

It was stated above that the emphasis factor identifier 116 generates the emphasis factor E 118 based on the correctness score C 110 and the relevance score R 114. The emphasis factor identifier 116 may identify the emphasis factor E 118 in any of a variety of ways. For example, referring to FIG. 6, a flowchart is shown of a method that may be used to implement step 208 of the method 200 shown in FIG. 2 for identifying the emphasis factor E 118. In the method shown in FIG. 6, the emphasis factor identifier 116 generates the emphasis factor 118 as a weighted sum of the correctness score 110 and the relevance score 114.

Figure 6:
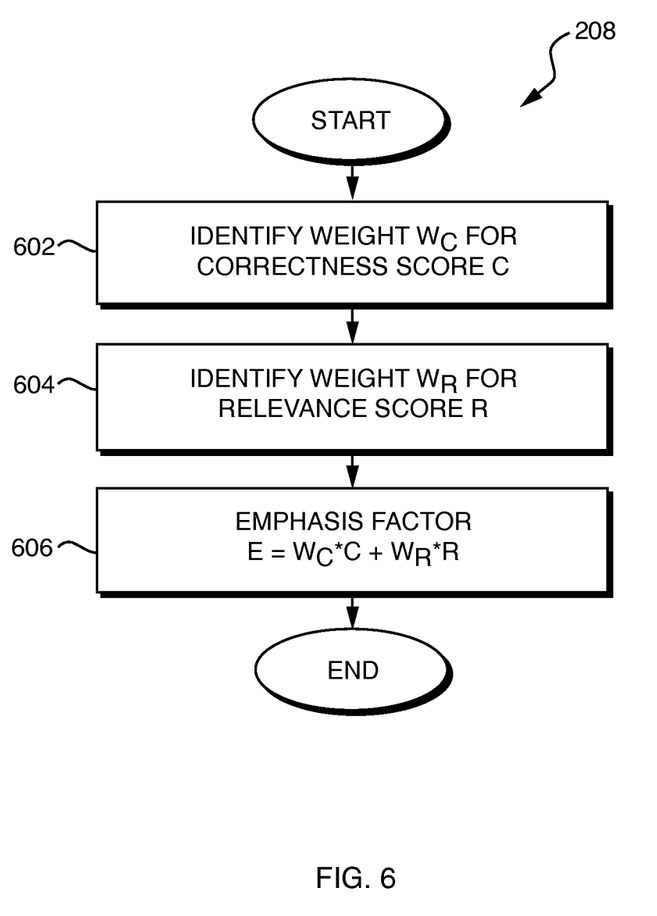
FIG. 6 is a flowchart of a method for identifying an emphasis factor to apply to a region of an audio stream based on a correctness score and a relevance score of the region.

The emphasis factor identifier 116 identifies a weight $W_C$ for the correctness score C (step 602) and a weight $W_R$ for the relevance score R (step 604). The emphasis factor identifier 116 identifies the emphasis factor E 118 as a weighted sum of C and R, using the weights $W_C$ and $W_R$, respectively (step 606). Note that each of the weights $W_C$ and $W_R$ may be positive, negative, or equal to zero.

The relevance score R may, for example, be one of the following symbolic values: (1) "filler," corresponding to audio regions (such as silence and coughs) not having any speech content; (2) "non-transcribed," corresponding to audio regions containing speech (such as greetings and intermittent conversation with third parties) that is completely irrelevant and therefore not transcribed; (3) "normal," corresponding to audio regions containing normal speech suitable for transcription; and (4) "critical," corresponding to audio regions containing critical (highly relevant) speech (such as "no" and "not"). Such symbolic values may be ordered, with "filler" representing the lowest relevance and "critical" representing the highest relevance.

One way to use such symbolic values to adjust the playback rate is to associate a constant playback rate multiplier with each symbolic relevance value, with lower multipliers being associated with more relevant content. "Filler" audio regions may be treated as special cases. Each such region may be played back in a fixed duration (e.g., 1 second), or in a duration that is equal to a fixed value (e.g., 1 second) plus a fraction (e.g., 1/10) of the original duration of the audio region. The intent of such a scheme is to play back content at a speed that is inversely related to its relevance, with the exception of "filler" content, which is played back at a highly accelerated speed that still allows the user to identify non-filler audio and thereby determine that the content was incorrectly classified as "filler."

The correctness score C 110 and the relevance score R 114 may, for example, be combined to produce the emphasis factor E 118 as follows. The speech recognizer may be assigned a default correctness score $C_R$ based on the recognizer's observed average rate of recognition accuracy. Recall that a confidence measure $C_M$ is associated with each document region. The final correctness score C of a document region may be calculated as $C_M/C_R$. The final emphasis factor E 118 may be obtained as R/C.

Upper and lower bounds may be imposed on the emphasis factor E. For example, if E is a playback rate adjustment factor, it may be limited to the range [1, 10] to ensure that the audio stream is played back at no less than half the default rate and at no more than twice the default rate.

Among the advantages of the invention are one or more of the following. Embodiments of the present invention facilitate the process of proofreading draft transcripts by playing back the corresponding spoken audio stream with an emphasis on critical regions in the audio stream. Critical regions are identified based on their content. More specifically, a region may be considered critical if it is highly relevant or likely to have been transcribed incorrectly. Emphasizing these regions focuses the attention of the proofreader on them, thereby increasing the likelihood that the proofreader will correct any errors in those regions.

As described above, critical regions of the audio stream may be emphasized by playing them back more slowly than non-critical regions. If emphasis is achieved by speeding up the playback of the non-critical regions relative to a default playback rate, proofreading may be performed more quickly than with conventional playback methods, but without sacrificing accuracy. Furthermore, if emphasis is achieved by slowing down the playback of the critical regions relative to the default playback rate, the proofreader may better be able to discern the speech in those regions and thereby be better able to correct any corresponding transcription errors. If emphasis is achieved both by speeding up the playback of the non-critical regions and by slowing down the playback of the critical regions, it may be possible for the entire audio stream to be played back in a shorter period of time than if it had been played back at the default (e.g., real-time) rate, while still providing the proofreader with the benefit of slowed-down critical regions.

Increased speed may be achieved without sacrificing accuracy, and even while improving accuracy, because the de-emphasized non-critical regions are those which are least likely to correspond to a document region containing an error. Such regions do not require the focused attention of the proofreader because the corresponding document regions are unlikely to require correction. If de-emphasis is achieved by increasing the playback rate, such regions can be played back more quickly and thereby decrease the overall time required for proofreading without sacrificing accuracy.

Furthermore, embodiments of the present invention do not prevent errors in non-critical regions from being corrected. Even when a non-critical region is de-emphasized, the proofreader may still recognize an error in the region and correct it. If, for example, a non-critical region is played more quickly than usual, the speech in the non-critical region may still be audible to the proofreader, who may still recognize an error in the region and correct it. This feature provides a degree of protection against misclassification of regions as non-critical, by effectively enabling the human proofreader to override such a classification in the event of an error that is detectable even when un-emphasized or de-emphasized. This ability to override the classification of regions as non-critical is absent in prior art systems that merely remove or suppress the playback of audio that is classified as non-critical.

Although the previous discussion may refer to "critical" and "non-critical" regions, and to "emphasizing" and "de-emphasizing" such regions, embodiments of the present invention are not limited to such binary distinctions between regions and the emphasis placed on them. Rather, any region may be classified as falling along a continuum of criticality having a corresponding degree of emphasis falling along its own continuum. As described above, the correctness score C and relevance score R, and their respective weights, may have any values, and may be combined in any way to produce the emphasis factor E. The modified audio stream 122 that results from applying the emphasis factor E 118 to the original audio region A 106 may therefore have any degree of emphasis. This flexibility allows the system 100 to emphasize different regions of the audio stream 102 to different degrees. When emphasis is achieved by playing back audio regions more slowly than surrounding regions, the ability to provide varying degrees of emphasis in this way produces the most efficient playback speed and the one that is most likely to produce the highest accuracy rate for the amount of time that is required to proofread the draft transcript 124.

Despite this flexibility, embodiments of the present invention may use quantized degrees of emphasis. For example, the system 100 may quantize the emphasis factor E 118 into three values: emphasized, de-emphasized, and neutral. If emphasis is achieved using timescale adjustment, these three values may correspond to a slower-than-realtime playback speed, a faster-than-realtime playback speed, and a realtime playback speed. This is merely one example of a way in which emphasis factors may be quantized and does not constitute a limitation of the present invention.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

As described above, the playback rate of regions in the audio stream 102 may be modified to provide appropriate emphasis. Such playback rate adjustments may be performed with or without additional adjustments, such as pitch adjustment, adjustments to the signal power of the contained signal, or using perceptually motivated transformations that shorten vowel playback more than that of consonants.

Placing emphasis on a word may produce a jarring effect to the listener, making the word be difficult to understand and sound unnatural. Such an effect may be produced, for example, if the playback rate is adjusted sharply to play back an individual word very quickly in comparison to the words preceding and following it. To address this problem an emphasized word may, for example, be made to sound more natural by gradually increasing the emphasis of speech beginning a few words before the emphasized word, and then gradually decreasing the emphasis of speech for a few words after the emphasized word. Such smoothing of emphasis may not only make the emphasized speech sound more natural but also make it easier to understand, thereby increasing the effectiveness of the emphasized word for correcting transcription errors in the draft transcript 124.

Similarly, if a word's correctness score is relatively low (and its likelihood of incorrectness is therefore relatively high), then one or more subsequent words may be played back slowly to provide the human proofreader 126 with sufficient time to edit the (likely) incorrect word. Decreasing the playback rate of such subsequent words optimizes the editing process itself by making it possible to perform editing without stopping, rewinding, and then restarting the playback of the audio stream 102.

Although in particular examples disclosed herein emphasis is placed on regions of the audio stream 102 by playing back such regions more slowly than surrounding regions, this is not a limitation of the present invention. Emphasis may be achieved in other ways. For example, the region A 106 of the audio stream 102 may be emphasized by increasing the power of the emphasis-adjusted audio stream 122 corresponding to the audio region A 106. Furthermore, additional emphasis may be placed on a region of the audio stream 102 by modifying the way in which the corresponding content in the draft transcript 124 is rendered. For example, additional emphasis may be placed on a region in the audio stream 102 by changing the color, font, or font size of the corresponding word(s) in the draft transcript 124.

The discussion above refers to correctness score C 110 and relevance score R 114. Such scores may have values measured on any scale. For example, the correctness score 110 may have values in the range [0,1] and the relevance score R 114 may have symbolic values as described above. Furthermore, a higher value of the relevance score R 114 may indicate either a higher likelihood of correctness or a higher likelihood of error. Therefore, the "correctness" score C 110 may be interpreted either as a correctness score or as an incorrectness (error) score. Similarly, a higher value of the relevance score R 114 may indicate either a higher relevance or a lower relevance. Therefore, the "relevance" score R 114 may be interpreted either as a relevance score or as an irrelevance score.

Similarly, the emphasis factor E 118 may have a value that is measured on any scale. Furthermore, a higher value of the emphasis factor E 118 may indicate either greater or lesser emphasis. Therefore, the "emphasis" factor E 118 may be interpreted either as an emphasis factor or as a de-emphasis factor.

The discussion above may refer to audio regions that are "highly" relevant and/or "likely" to have been transcribed incorrectly. These and other similar terms are used merely for purposes of illustration and do not impose any limitations on embodiments of the present invention. For example, it is not required that an audio region exceed any particular threshold of relevance or likelihood of error to be emphasized during playback. Rather, as the discussion above makes clear, there may be any relationship between the correctness score, relevance score, and emphasis factor associated with a particular audio region. In general, the emphasis factor need only be based on the correctness score and/or the relevance score.

Although in various examples described above the emphasis factor identifier 116 identifies the emphasis factor E 118 based on a combination of the correctness score C 110 and the relevance score R 114, this is not a requirement of the present invention. Rather, the emphasis factor identifier 116 may identify the emphasis factor E 118 based solely on the correctness score C 110 or based solely on the relevance score R 114.

Although the modified version of the audio region A 106 may be referred to herein as an "emphasized" or "emphasis-adjusted" audio stream 122, this does not mean that the emphasis-adjusted audio stream 122 must differ from the original audio region A 106. Rather, the "emphasis-adjusted" audio stream 122 may be an emphasized version of the audio region A 106, a de-emphasized version of the audio region A 106, or the same as the audio region A 106, depending on the value of the emphasis factor E 118.

Furthermore, the term "emphasis" is used herein generally to refer to the effect of emphasizing the playback of a particular audio region in a particular context, not specifically to any particular technique for achieving such emphasis. For example, an audio region may be emphasized by slowing down its playback, by speeding up the playback of surrounding audio regions, or by a combination of both. It is possible, therefore, to "emphasize" the playback of an audio region by playing back the audio region itself without modification and by modifying the playback of surrounding audio regions. References to "emphasizing" audio regions herein should be understood to refer to any kind of technique for achieving emphasis.

Although certain embodiments of the present invention disclosed herein detect and correct errors in documents generated based on speech, techniques disclosed herein may also be applied to detect and correct errors in documents that were not generated based on speech. For example, techniques disclosed herein may be used to identify emphasis factors for regions in a document and to "play" the regions of the document in accordance with the emphasis factors using a text-to-speech engine. A document may be "played" in this way over a telephone interface, for example, to minimize the playback time.

Although the preceding description describes factors that may influence the prior likelihood of correctness and prior relevance of regions in the draft transcript 124, such factors are merely examples and do not constitute limitations of the present invention. Examples of other factors that may influence the prior likelihood of correctness and/or prior relevance of a region in the draft transcript 124 include the identity of the speaker, the domain of the audio stream 102 (e.g., medical or legal), the worktype of the draft transcript 124 (e.g., letter, discharge summary, progress note, consultation note, discharge summary, or radiology report in the context of medical reports), and the section of the draft transcript 124 in which the region occurs. As a result, the same word may, for example, have a different prior likelihood of correctness and/or prior relevance depending on the section of the document in which the word occurs.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method performed by a computer processor executing computer program instructions tangibly stored on a first computer-readable medium to perform a method comprising:

(A) deriving, from a region of a document and a corresponding region of a spoken audio stream, a likelihood score representing a likelihood that the region of the document correctly represents content in the corresponding region of the spoken audio stream, and tangibly storing a representation of the likelihood score in a second computer-readable medium;

(B) selecting a relevance score representing a measure of relevance of the region of the spoken audio stream, the measure of relevance representing a measure of importance that the region of the spoken audio stream be brought to the attention of a human proofreader, and tangibly storing a representation of the relevance score in a third computer-readable medium;

(C) deriving, by dividing the relevance score by the likelihood score, an emphasis factor for modifying an emphasis placed on the region of the spoken audio stream when played back, and storing a representation of the emphasis factor in a fourth computer-readable medium; and (D) modifying, in accordance with the emphasis factor, the emphasis placed on the region of the spoken audio stream by gradually increasing an emphasis factor applied to at least one word occurring before a first word in the region of the spoken audio stream, producing an emphasis-adjusted audio stream.

2. The method of claim 1, wherein (C) comprises deriving, from the likelihood and the measure of relevance, a timescale adjustment factor for adjusting a playback rate of the region of the spoken audio stream.

3. The method of claim 1, wherein (C) comprises deriving, from the likelihood and the measure of relevance, a signal power adjustment factor for adjusting a signal power of the region of the spoken audio stream.

4. The method of claim 1, further comprising:
(E) playing the emphasis-adjusted audio stream.

5. The method of claim 4, further comprising:
(F) correcting errors in the document based on the emphasis-adjusted audio stream.

6. A method performed by a computer processor executing computer program instructions tangibly stored on a first computer-readable medium to perform a method comprising:

(A) deriving, from a region of a document and a corresponding region of a spoken audio stream, a likelihood score representing a likelihood that the region of the document correctly represents content in the corresponding region of the spoken audio stream, and tangibly storing a representation of the likelihood score in a second computer-readable medium;

(B) selecting a relevance score representing a measure of relevance of the region of the spoken audio stream, the measure of relevance representing a measure of importance that the region of the spoken audio stream be brought to the attention of a human proofreader, and tangibly storing a representation of the relevance score in a third computer-readable medium;

(C) deriving, by dividing the relevance score by the likelihood score, an emphasis factor for modifying an emphasis placed on the region of the spoken audio stream when played back, and storing a representation of the emphasis factor in a fourth computer-readable medium; and (D) modifying, in accordance with the emphasis factor, the emphasis placed on the region of the spoken audio stream by gradually decreasing the emphasis factor applied to at least one word occurring after a last word in the region of the spoken audio stream, producing an emphasis-adjusted audio stream.

7. The method of claim 6, wherein (C) comprises deriving, from the likelihood and the measure of relevance, a timescale adjustment factor for adjusting a playback rate of the region of the spoken audio stream.

8. The method of claim 6, wherein (C) comprises deriving, from the likelihood and the measure of relevance, a signal power adjustment factor for adjusting a signal power of the region of the spoken audio stream.

9. The method of claim 6, further comprising:
(E) playing the emphasis-adjusted audio stream.

10. The method of claim 9, further comprising:
(F) correcting errors in the document based on the emphasis-adjusted audio stream.

* * * * *